E. C. SOPER.
TREATMENT OF PHOSPHATES.
APPLICATION FILED DEC. 19, 1913.
1,281,681.
Patented Oct. 15, 1918.
3 SHEETS—SHEET 3.
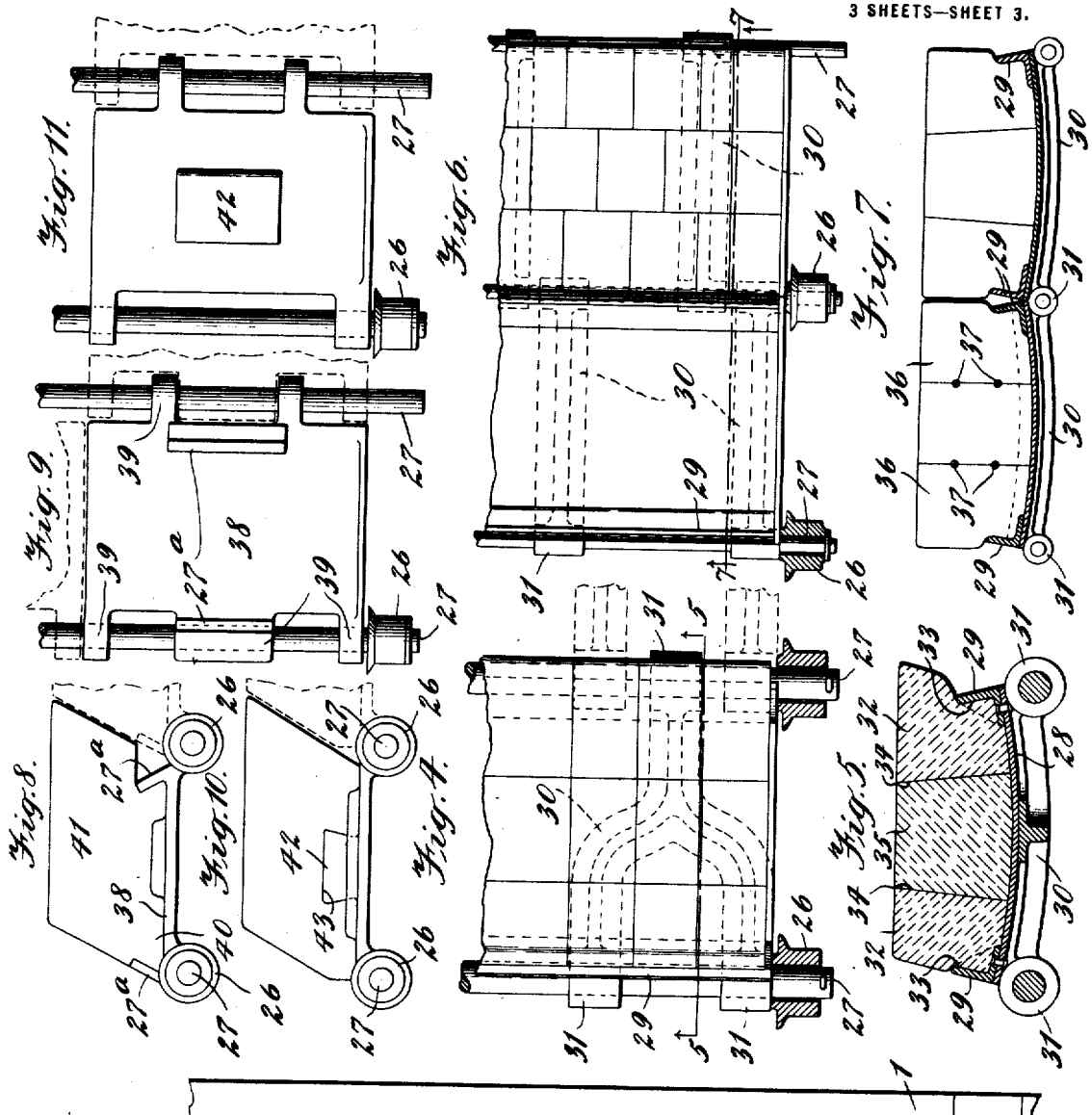
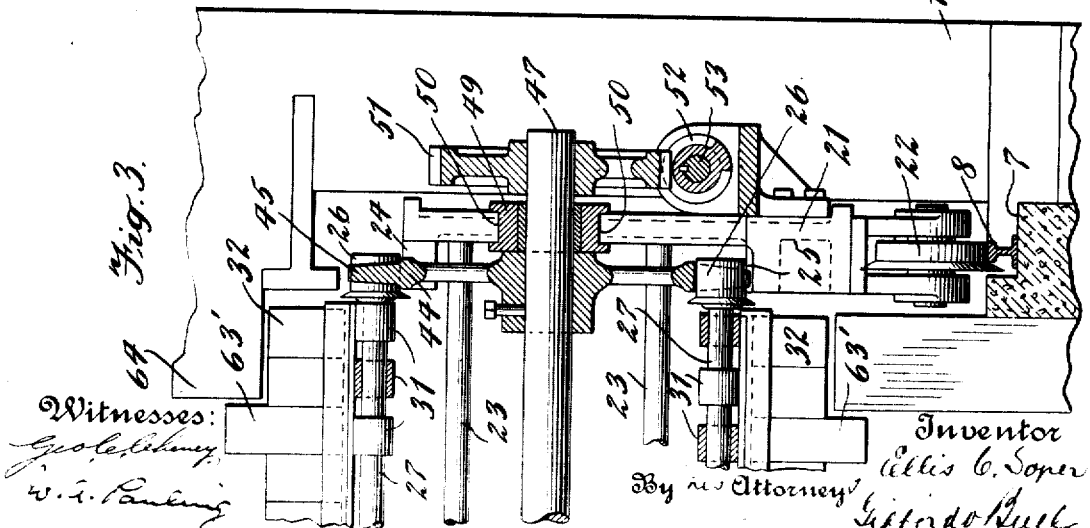

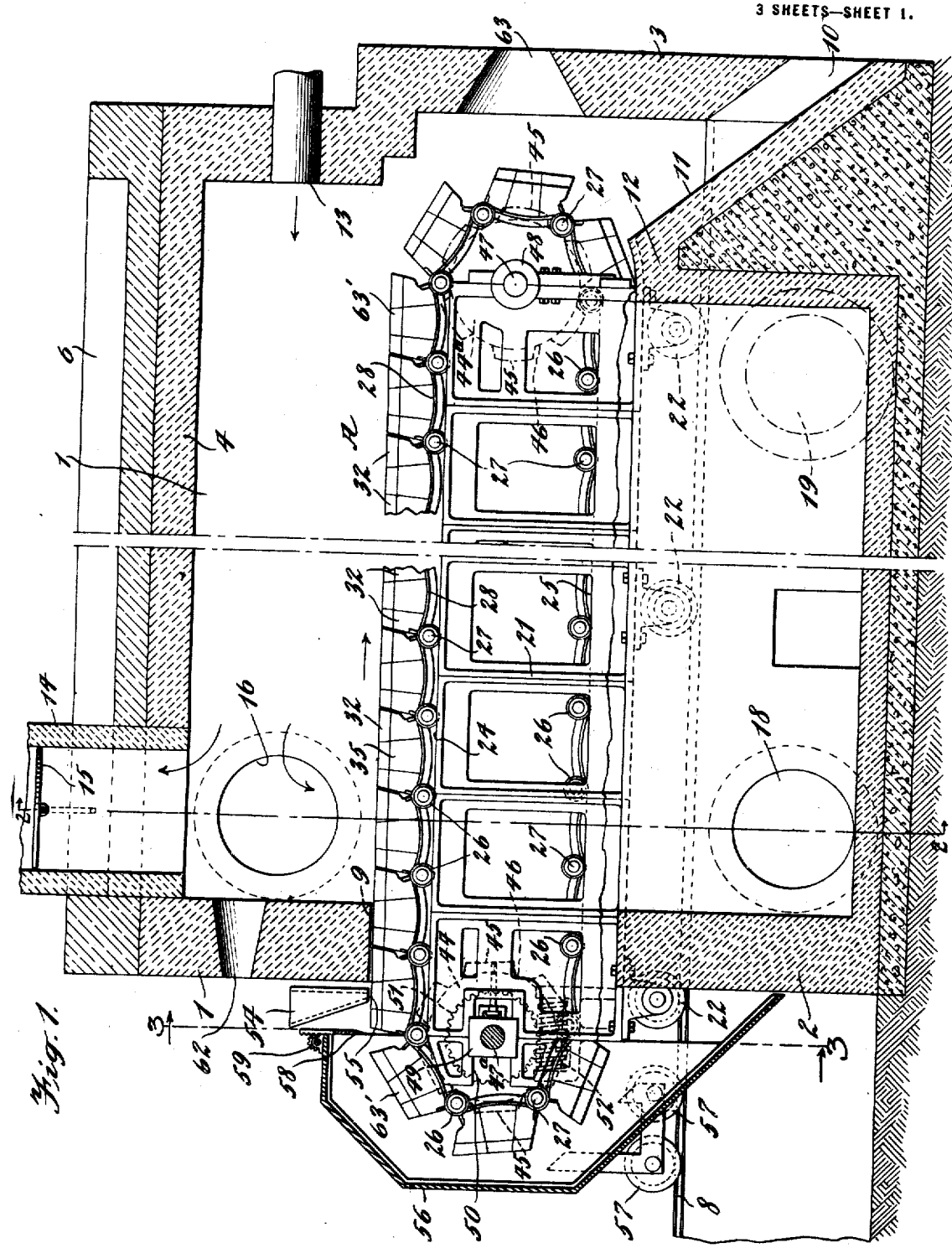

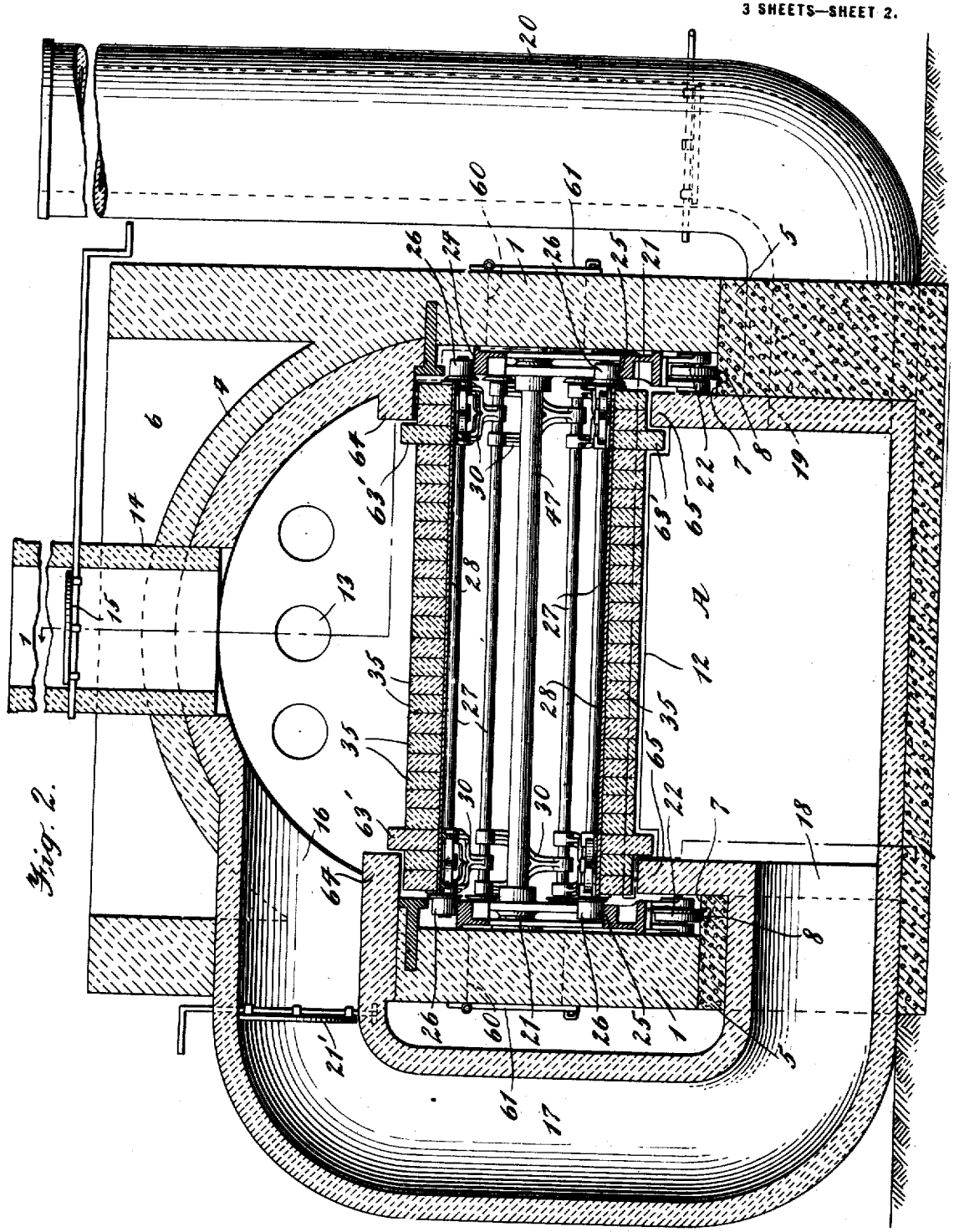

UNITED STATES PATENT OFFICE.

ELLIS C. SOPER, OF CHATTANOOGA, TENNESSEE, ASSIGNOR TO ARMOUR FERTILIZER WORKS, OF CHICAGO, ILLINOIS, A CORPORATION OF NEW JERSEY.

TREATMENT OF PHOSPHATES.

1,281,681.  Specification of Letters Patent.  Patented Oct. 15, 1918.

Application filed December 19, 1913. Serial No. 807,593.

*To all whom it may concern:*

Be it known that I, ELLIS C. SOPER, a citizen of the United States, residing at Chattanooga, in the county of Hamilton and State of Tennessee, have invented certain new and useful Improvements in the Treatment of Phosphates, of which the following is a specification.

My invention relates to new and useful improvements in the treatment of phosphates, and particularly relates to the conversion of insoluble calcium phosphate into citrate soluble form for use as fertilizers. It has been proposed to treat insoluble calcium phosphate, with the addition of alkali metal salts and other reagents or alkalis, with heat at a calcining temperature in order to convert the same into citrate soluble form, but such proposals have been proven, as far as I am aware, commercially impracticable because of the fact that it has been necessary to treat batches of the raw material intermittently, and in such small quantity as to make the cost of production preclude the use of the process commercially. It is, therefore, my purpose to provide a method of procedure, which will provide for the continuous treatment of insoluble calcium phosphate, with added alkali metal salt or salts or other reagents or alkalis, to render the same citrate soluble, so that the soluble form may be produced in sufficient quantity, and at cost low enough to admit of the process being practised commercially.

It has been demonstrated that, in order to produce complete conversion of the insoluble calcium phosphate with added alkali metal salt, to citrate soluble form, it is essential that the mixture be initially rendered porous so that the heating gases employed in the calcination may find ready access throughout the body of the material being treated, and any gases formed as the result of chemical reactions may escape from the body of the material, in order that the percentage of conversion from insoluble to citrate soluble form will be practicable.

In order to accomplish the above objects, I preferably provide a structure to be hereinafter described which, in one of its forms, may be used for rendering the raw material porous, as above set forth, after which it may be conveyed to a suitable calcining furnace, for instance, a rotary kiln, to subject it to calcination and consequent conversion to soluble form, or the invention may take a form in which it is useful not only for performing the function of rendering the material porous, but also of calcining. In the latter-mentioned form there is substantially no difference in structure over the form first mentioned except that the dimensions are greater in order that the period during which the material is subjected to heat will be lengthened.

The invention consists in the improvements to be more fully described hereinafter, and the novelty of which will be particularly pointed out and distinctly claimed.

I have fully and clearly illustrated one form of apparatus adapted to carry out my invention in the accompanying drawings, to be taken as a part of this specification, and wherein:

Figure 1 is a vertical longitudinal section through a structure embodying my invention, the section being taken on the line 1—1 of Fig. 2;

Fig. 2 is a vertical transverse section of the embodiment shown in Fig. 1, taken on the line 2—2 of Fig. 1;

Fig. 3 is an enlarged vertical section taken on the line 3—3 of Fig. 1;

Fig. 4 is a detailed plan view, partly in section, of a portion of the carrying table;

Fig. 5 is a section on the line 5—5 of Fig. 4;

Fig. 6 is a plan view showing another form of the table;

Fig. 7 is a section on the line 7—7 of Fig. 6;

Fig. 8 is an end elevation of another form of the table;

Fig. 9 is a detailed plan view of a portion of the table and constructed as shown in Fig. 8;

Fig. 10 is an end elevation of still another form of the table; and,

Fig. 11 is a detailed plan view of the construction shown in Fig. 10.

Referring to the drawings by characters of reference:

A designates generally a furnace chamber formed by a suitable inclosing structure which may be constructed of vertical side walls 1, 1, front and rear end walls 2, 3, respectively, and a crown or roof 4. It will be understood that the structure may be of proper material to resist high temperatures or lined with such material. The side walls may rest on suitable foundation walls 5 which, in fact, form part of the bases of the side walls, as shown in Fig. 2. The side walls may also be extended vertically above the lower side edges of the crown to form a receptacle for an earth fill 6 for heat insulating purposes, so that the heat will not be lost by radiation.

The foundation walls 5, above mentioned, project inward from the main side walls 1, 1, to form ledges 7 running from front to rear of the chamber A, and upon which are supported track rails 8 of any suitable form for a purpose to be presently set forth.

The front end wall 2 is constructed with an opening 9, and the rear wall 3 has an outlet opening 10, to which leads an inclined wall or chute 11 formed on the rear face of a bridge wall 12, extending transversely of the chamber A, at the rear of the latter in advance of said rear wall 3.

In the rear wall 3, at a point adjacent the upper portion thereof, is an inlet nozzle 13 for a blast pipe for admitting a combustion medium to be burned in the furnace, such, for instance, as a mixture of air and producer gas, natural gas, oil or pulverized coal. I might also use waste heat from a calcining furnace or heat from another source in heating the furnace when it is used only as a drier. This blast nozzle is arranged preferably to direct its blast horizontally and lengthwise of the furnace chamber for a purpose to be presently described. At its forward end the furnace chamber is provided with an outlet stack 14, which may be controlled by a suitable damper 15, said stack preferably rising from and opening through the crown or roof of the chamber.

In one of the side walls 1, adjacent the forward upper portion thereof, as shown in Fig. 1, is an outlet 16 which is connected by a flue or duct 17 with an inlet 18 located in the forward lower portion of the said side wall, said flue or duct being located outside of the furnace, as shown clearly in Fig. 2. Through the said side wall 1, at the bottom thereof, and preferably just in advance of the bridge wall 12, is an outlet 19 leading to a stack 20. The flue 17 is preferably provided with a damper 21', of any suitable construction, whereby communication with the furnace chamber may be established and cut off.

Arranged within the furnace chamber is an endless table adapted to receive, on the upper surface of the upper run thereof, the material to be treated. This table may take a number of different forms without departing from my invention, but I prefer to construct it as follows:

21, 21, designate vertical side frames, each of which is provided at its lower portion with flanged running wheels 22 adapted to travel on the track-rails 8, 8, heretofore described. These side frames 21, 21, are connected rigidly by means of cross-bars 23 (see Fig. 3). The side frames are each provided with upper and lower rails 24, 25, respectively, upon which run flanged guide-wheels 26 upon the ends of cross-shafts or bars 27, which serve as connecting means for the parts forming the endless table to be presently described. The preferred form of this table comprises a plurality of parts which are flexibly connected by said shafts 27, and each of which comprises a plate 28 extending transversely of the table, and provided on its transverse longitudinal edges with flanges 29 inclined toward each other, as shown in Figs. 5 and 7, said plates being preferably curved in cross section, as shown in Figs. 5 and 7 of the drawings, although they may be flat, as shown in Figs. 8 and 10, if desired. These transverse members or plates 28 are mounted upon supporting and connecting members 30 provided with hinge ears 31, by means of which they are pivotally or hingedly connected to the transverse bars or shafts 27, heretofore described. The transverse plates or members 28 serve as supporting and holding means for suitable refractory material to serve as the supporting surface of the table, and to heat the material being treated. Preferably the flanges 29 are inclined inwardly to coöperate with blocks 32 of refractory material located along the longitudinal edge portions of said plates, which blocks are formed at the bases of their outer sides with shoulders 33 to lock under said flanges. The blocks 32 are preferably of such material as to resist high temperatures, and be a poor conductor. The said blocks, on their inner faces, are provided with inclined faces 34 which, when the blocks are in position on the supporting plate, form a wedge-shaped space between the blocks adapted to receive a wedge-shaped key-block 35 which not only serves to complete the supporting surface, but serves as a key in coöperation with said blocks 32 and the flanges 29 to lock all of said blocks in position. By this arrangement the blocks may be easily removed and replaced when necessary.

The above description applies to the construction shown in Figs. 4 and 5, and the construction shown at the right of Figs. 6 and 7, but I desire it understood that my invention is not limited to any particular way of securing the blocks in place, as I may use the construction shown at the left of Fig. 7, in which the flanges 29 are employed, but blocks 36 with straight inner sides are employed instead of having the inclined faces as above described, said blocks being provided with adjacent grooves 37 adapted to receive cement or other keying or interlocking material.

In the construction shown in Figs. 8 and 9, instead of employing plates which are continuous across the table, I may form each section of the table of a plurality of plates 38 arranged end to end, and each formed with hinged ears 39, adapted to hingedly receive the transverse shaft 27, heretofore described. In the form shown in Figs. 8 an 9 the front and rear edges of each of these plates are provided with inwardly-directed flanges 27ª forming a wedge-shaped space adapted to receive the correspondingly formed base 40 of a block 41 of refractory material, said blocks being inserted in place by sliding the said bases 40 beneath the said flanges by movement transversely of the plate. In Fig. 10, instead of having the front and rear inclined flanges, I provide a wedge-shaped boss 42 in the center of the plate adapted to interlock with an undercut recess 43 in the base of the block, the latter being secured in place by sliding it into engagement with the boss by movement transversely of the plate. These plates, whether of the form shown in Figs. 4 to 7, or of the forms shown in Figs. 8 to 11, are flexibly connected by the said transverse bars or shafts 27, and form an endless table adapted to move lengthwise of the main frame, the said flanged running-wheels 26 traveling on the upper and lower rails 24, 25, heretofore described. At the ends the sectional table passes around suitable sprocket wheels 44, 44ª, having teeth or projections 45 and intervening spaces 46, the latter being adapted to receive the wheels 26 on the transverse shafts or bars 27 during movement of the table. The sprocket wheel 44 at the rear end of the table is mounted on a shaft 47 journaled in fixed bearings 48, but I prefer to mount the sprocket-wheel 44 at the forward end of the table on a shaft 47ª journaled in bearing boxes 49 mounted in horizontally-disposed guide-ways 50 in the side frames 21, and adapted to be adjusted in side guide-ways to regulate the tension on the endless table. On one end of the forward sprocket-wheel shaft 47ª is a worm-wheel 51 meshing with a worm-pinion 52 mounted on a suitable drive shaft 53, by means of which the table is caused to travel in the direction of the arrow, as shown in Fig. 1, by power from any suitable source. The flexible table is preferably of such length that, when in position in the furnace chamber A, the inner end thereof will take a position over the chute 11 to discharge material carried on the table upon said chute, while the forward end of the table projects outside of the furnace through the opening 9. It will be seen that the whole table may be easily withdrawn from the furnace chamber for inspection or repair.

Arranged outside the furnace and over the table is a supply hopper 54 extending transversely of the table and having at its bottom a narrow outlet slot 55. This hopper is adapted to receive, in a liquid state or plastic state, the material to be treated which passes out of the narrow slot 55 in a thin sheet onto the table, although I do not limit myself to any specific manner of depositing the material on the table.

Extending over the front end of the table is a protective hood 56, covering the said front end and constructed to confine the heat and prevent cooling of the table and escape of heat from the furnace, said hood being preferably lined with heat-resisting material, such as asbestos. The hood is preferably mounted on flanged wheels 57 running on the rails 8, so that the hood may be conveniently moved to and withdrawn from operative position. The hood carries a suitable scraper 58 adapted to clean the table of any material which may not be discharged therefrom at the chute 11. This scraper is preferably adjustable toward and away from the carrying surface of the table by means of a rack and pinion 59, shown in Fig. 1.

The track rails 8 are preferably arranged at a height above the inlet 18 and the exit 19, and the upper surface of the table travels at a point beneath the blast nozzle 13 and the outlet 16.

I may provide openings 60 in the side walls of the furnace to permit inspection of the interior thereof, and also to permit cooling of the metal parts of the table, should they become too hot. These openings may be covered with suitable closures 61, which may be opened when it is desired to inspect the interior of the furnace, or to admit the cooling air thereto. The furnace may also be provided, in the front wall, with an inspection opening 62, and with a similar opening 63 in the rear wall through which the conditions in the furnace may be inspected during the operation of drying and calcining.

It will be understood that the blocks of refractory material constituting the table are arranged close together when in horizontal or carrying position, so that the liquid or plastic mass will not flow down through the conveyer without being heated, but when the blocks reach the discharge end of the table the separation of the blocks, owing to the turning of the same over the end sprocket 44ª, will serve to separate the material from the surface of said blocks, which material will be discharged upon the chute 11.

I preferably form the blocks at the ends of the supporting plates 28, or at the side edges of the table, with flanges or projections 63′, the flanges or projections on adjacent blocks forming a continuous protective wall extending lengthwise of the table, which walls on the upper run of the table coöperate with longitudinal flanges 64 in the upper portion of the furnace to protect the metal portions of the table from the hot blast, while the flanges on the lower run of the table coöperate with walls 65 to protect the lower metallic portions of the table from the blast, said walls 65 projecting vertically above the level of the track-rails 8. By this arrangement I am enabled to employ a moving table, composed of parts which must of necessity be metallic, in a furnace where the temperatures range high enough to melt or destroy ordinary metallic parts, if such be subjected to direct effect of the heat.

The parts being constructed and arranged as above described, the process of treating the phosphate and the operation of the apparatus in carrying out the process are as follows:

The insoluble calcium phosphate, to be converted into citrate soluble form, is pulverized and reduced to a plastic or liquid state by mixture with water, the amount of water used being approximately 40 per cent. of the calcium phosphate by weight. To this mixture I add the alkali metal salt, which may be sodium sulfate or sodium carbonate, the amount employed being about 15 per cent. by weight of the phosphate. The endless table having been heated in the furnace, the material in its liquid or plastic state is poured into the hopper 54, whence it passes in a thin sheet through the slot 55 onto the highly heated upper surface of the table. As the table travels, the thin sheet of material is progressively laid on the same and said material is subjected to the heat of the furnace. It will be understood that the heating blast entering through the nozzle 13 passes in the direction opposite to the direction of travel of the table and passes lengthwise of the table, leaves the furnace through the outlet 16 and, by way of the flue 17, passes to the lower portion of the furnace through the inlet 18, from which lower portion it passes out through the stack 19. By this arrangement the upper surface of the table is highly heated and the blocks, as they pass into the lower run of the table, are maintained hot by the hot gases discharged into the lower part of the furnace, the result being that the blocks are highly heated when they reach the point where they receive the material from the feed hopper. If it is not desired to heat the lower run of the table, the damper 21 in the flue 17 may be closed and the damper 15 in the stack 14 moved to open position to permit the products to pass up the stack without passing to the lower portion of the furnace, or, if it is not desired to have the material in direct contact with the flame, the flame may be introduced in the lower part of the chamber A, the gases of combustion passing up the flue 17 which may be as shown, but would preferably be placed at the rear of the furnace.

When the construction described is to be employed only for rendering the material porous previous to being calcined in a separate furnace or kiln, the temperature created in the furnace by virtue of the burning of the hot blast need only be in the neighborhood of 1300° to 1800° F., but, if the construction is to be used both for rendering the material porous and calcining, the temperature attained should be from substantially 1800° F. to 2500° F.

When the liquid or plastic material with the added chemicals is deposited upon the surface of the highly heated table, the moisture will be evaporated very rapidly; that is, be substantially flashed out of the material, and a large portion of the chemicals employed will be volatilized. This is due to the direct impingement of the blast, of the radiated heat from the furnace lining and blast, and the heat received from the table, the moisture being, as stated, literally flashed out, leaving the material in thin, fragile, porous sheets or flakes. In carrying out the process with this apparatus it is highly desirable that the material be continuously subjected to the heat without having additional charges or supplies of the material superimposed thereon, so that the pores of the material will not be filled by additional charges, thereby closing the pores to the action of the heat, and according to my invention this result is efficiently attained, because, as the material is deposited on the table, it is subjected to the heat in a thin layer, and then moved with the table through the chamber A, and then discharged therefrom, before the blocks again reach the feed hopper.

What I claim and desire to secure by Letters Patent of the United States is:

1. The process of converting insoluble phosphate material to citrate soluble form, which consists in adding thereto water and a suitable alkali metal salt to provide a mixture liquid or plastic in form, flowing the mixture onto a highly heated surface to form a sheet or layer of substantially uniform thickness whereby it is quickly deprived of moisture and given the form of a porous body or mass on said surface, and subjecting the porous material to a calcining temperature.

2. The process of converting insoluble phosphate material to citrate soluble form, which consists in adding thereto water and a substance rendering the phosphate citrate soluble to produce a mixture liquid or plastic in form, continuously flowing the mixture onto a highly heated surface to form a sheet or layer of substantially uniform thickness whereby it is quickly deprived of moisture and given the form of a porous body or mass on said surface, subjecting the porous material to a calcining temperature and continuously removing the material from said surface after calcination.

In testimony whereof I have hereunto signed my name in the presence of two subscribing witnesses.

ELLIS C. SOPER.

Witnesses:
O. P. DARWIN,
J. H. McCALIUM.

It is hereby certified that in Letters Patent No. 1,281,681, granted October 15, 1918, upon the application of Ellis C. Soper, of Chattanooga, Tennessee, for an improvement in "The Treatment of Phosphates," errors appear in the printed specification requiring correction as follows: Page 1, lines 76–77, for the words "embodying my invention" read *capable of carrying my invention into effect;* page 3, line 7, for the word "shaft" read *shafts;* same page, line 8, for the word "an" read *and;* and that the said Letters Patent should be read with these corrections therein that the same may conform to the record of the case in the Patent Office.

Signed and sealed this 10th day of December, A. D., 1918.

[SEAL.]

F. W. H. CLAY,

*Acting Commissioner of Patents.*

Cl. 71—7.